United States Patent [19]
Ramey

[11] Patent Number: 5,752,297
[45] Date of Patent: May 19, 1998

[54] METHOD AND APPARATUS FOR SECURING FLEXIBLE SHEETING TO A CYLINDRICAL STRUCTURE

[76] Inventor: Willard J. Ramey, 14910 Meadow Dr., Grass Valley, Calif. 95945

[21] Appl. No.: 800,781

[22] Filed: Feb. 13, 1997

[51] Int. Cl.[6] .................................................. A44B 21/00
[52] U.S. Cl. .............................. 24/462; 24/460; 24/461
[58] Field of Search ........................... 24/460, 461, 462; 160/346, DIG. 6

[56] References Cited

U.S. PATENT DOCUMENTS

| | | | |
|---|---|---|---|
| 642,236 | 1/1900 | Larimer . | |
| 1,183,819 | 5/1916 | Keiser | 24/461 |
| 1,362,651 | 12/1920 | Towns | 24/460 |
| 3,114,412 | 12/1963 | Lishman | 160/348 |
| 3,141,221 | 7/1964 | Faulls, Jr. | 24/30.5 |
| 3,803,671 | 4/1974 | Stuppy et al. | 24/460 |
| 3,816,885 | 6/1974 | Saether | 24/243 K |
| 4,759,518 | 7/1988 | Yardas | 248/97 |
| 4,847,958 | 7/1989 | Conley | 24/462 |
| 4,903,629 | 2/1990 | Maudlin et al. | 114/361 |
| 4,907,637 | 3/1990 | Hintsa | 24/460 |
| 5,182,827 | 2/1993 | Carrier et al. | 5/498 |
| 5,371,925 | 12/1994 | Sawatsky | 24/460 |

*Primary Examiner*—Victor N. Sakran
*Attorney, Agent, or Firm*—Bradley P. Heisler

[57] ABSTRACT

A system for securing flexible sheeting material S to a series of interconnected frame elements 60 is provided. Multiple frame elements 60 are secured together, such as through end joints 70. The frame elements 60 generally define an enclosure 80 or other structure which is to be enclosed by sheeting S. The sheeting S is then draped over the frame elements 60 until the sheeting S has the desired configuration overlying the frame elements 60. Clamps 10 are then utilized to secure the sheeting S to the frame elements 60. The clamps 10 are "C-shaped" in cross-section and are sized with an interior region 18 thereof similar to a diameter of a cylindrical surface 64 of the frame elements 60. The clamps 10 are sufficiently resilient that the clamps 10 can be flexed to allow the frame elements 60 to pass into and reside within the interior region 18 with the sheeting S interposed between the frame element 60 and the clamp 10. The clamps 10 thus secure the sheeting S in the desired position for forming the enclosure 80.

20 Claims, 3 Drawing Sheets

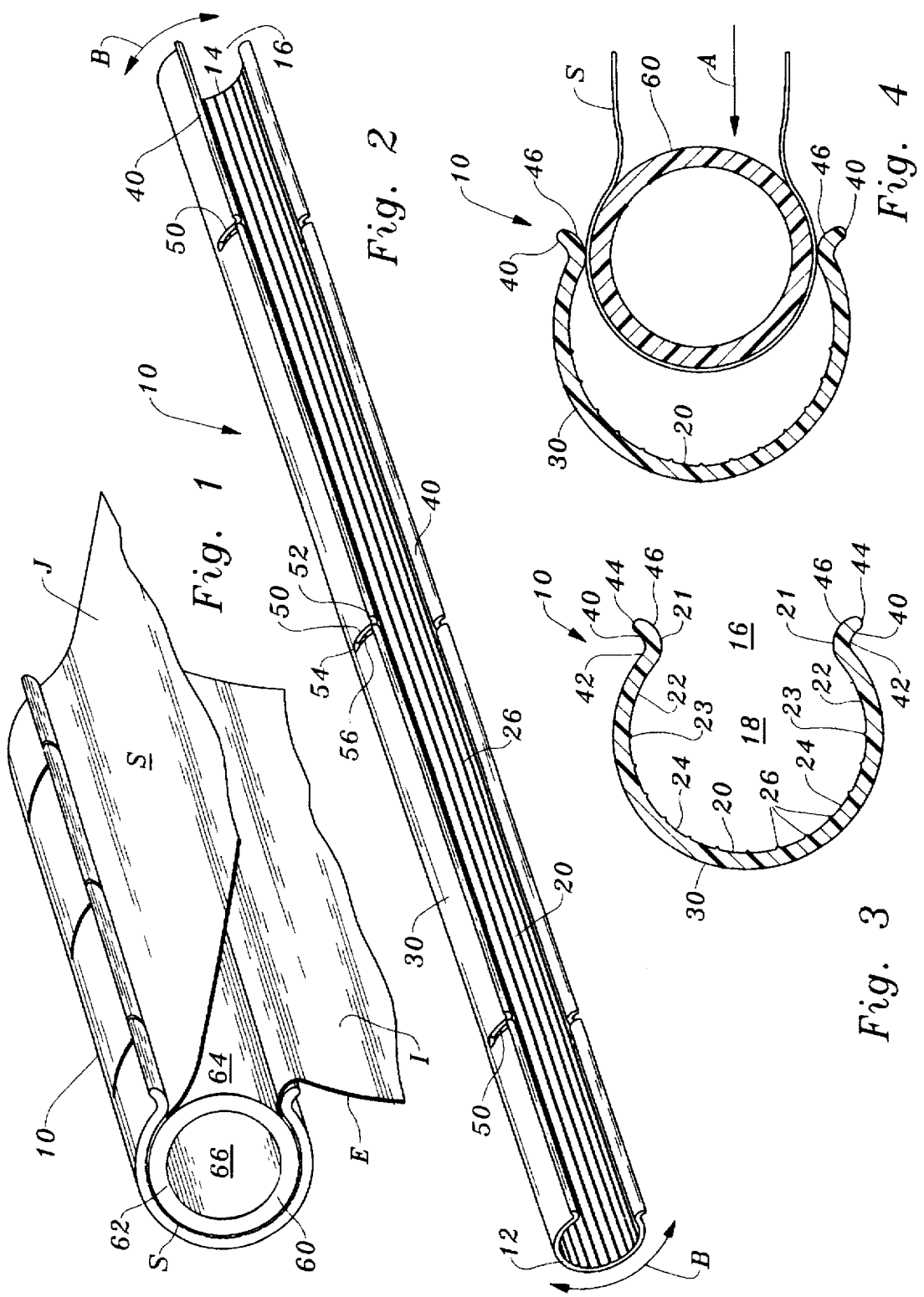

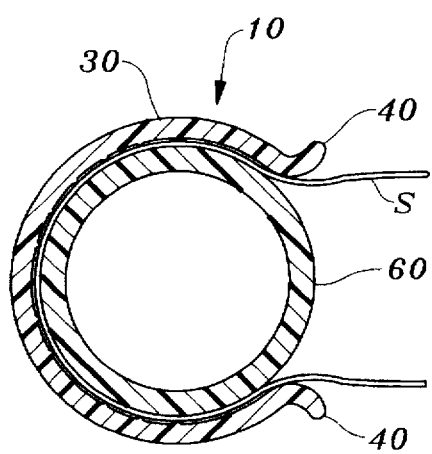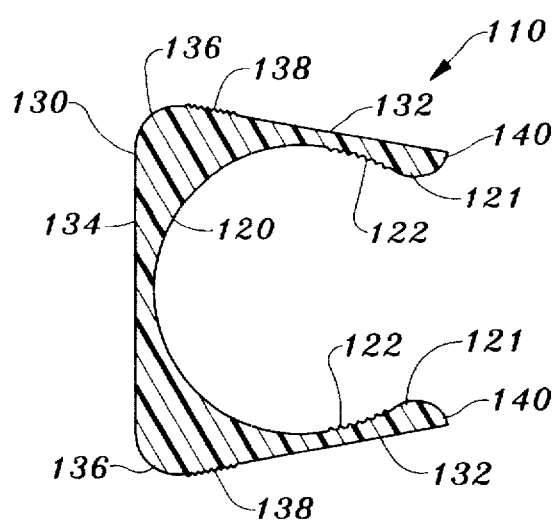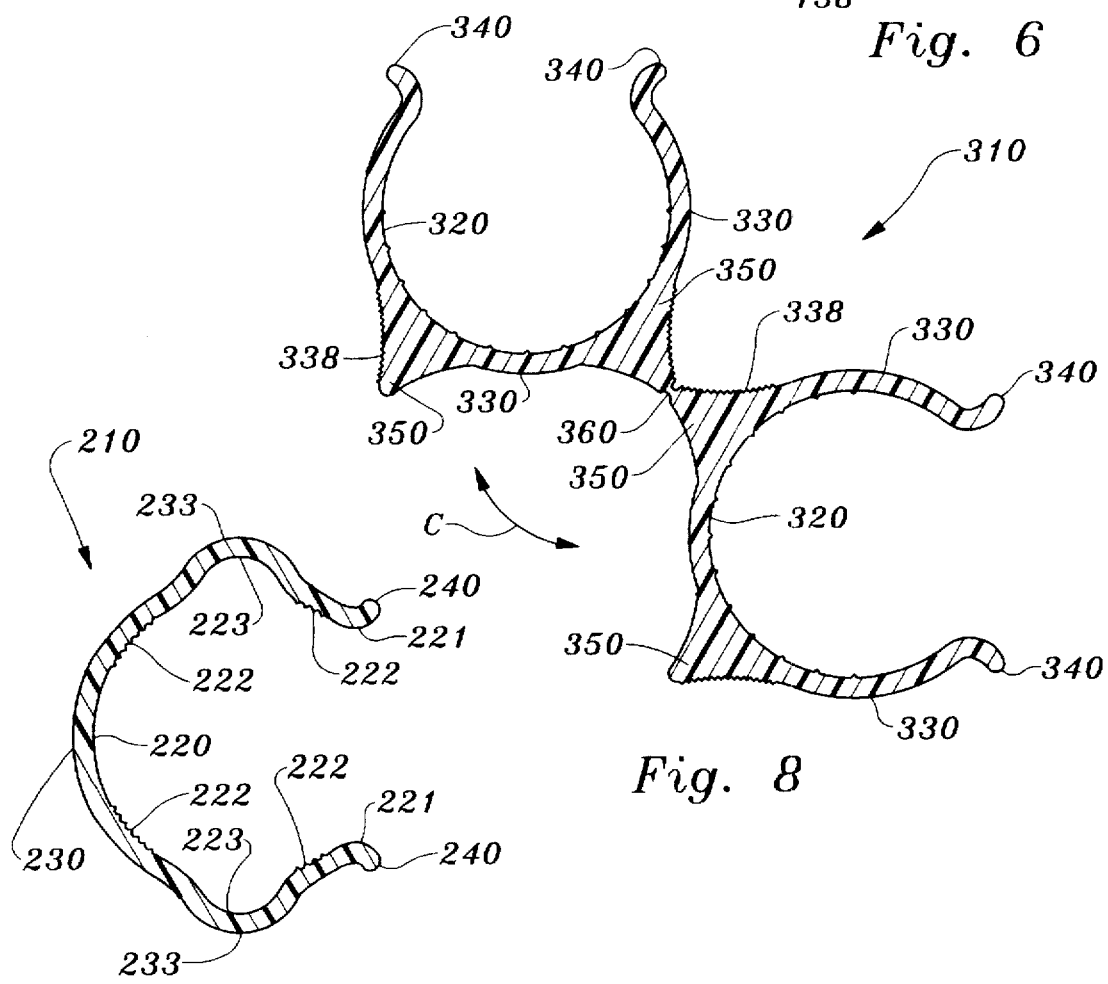

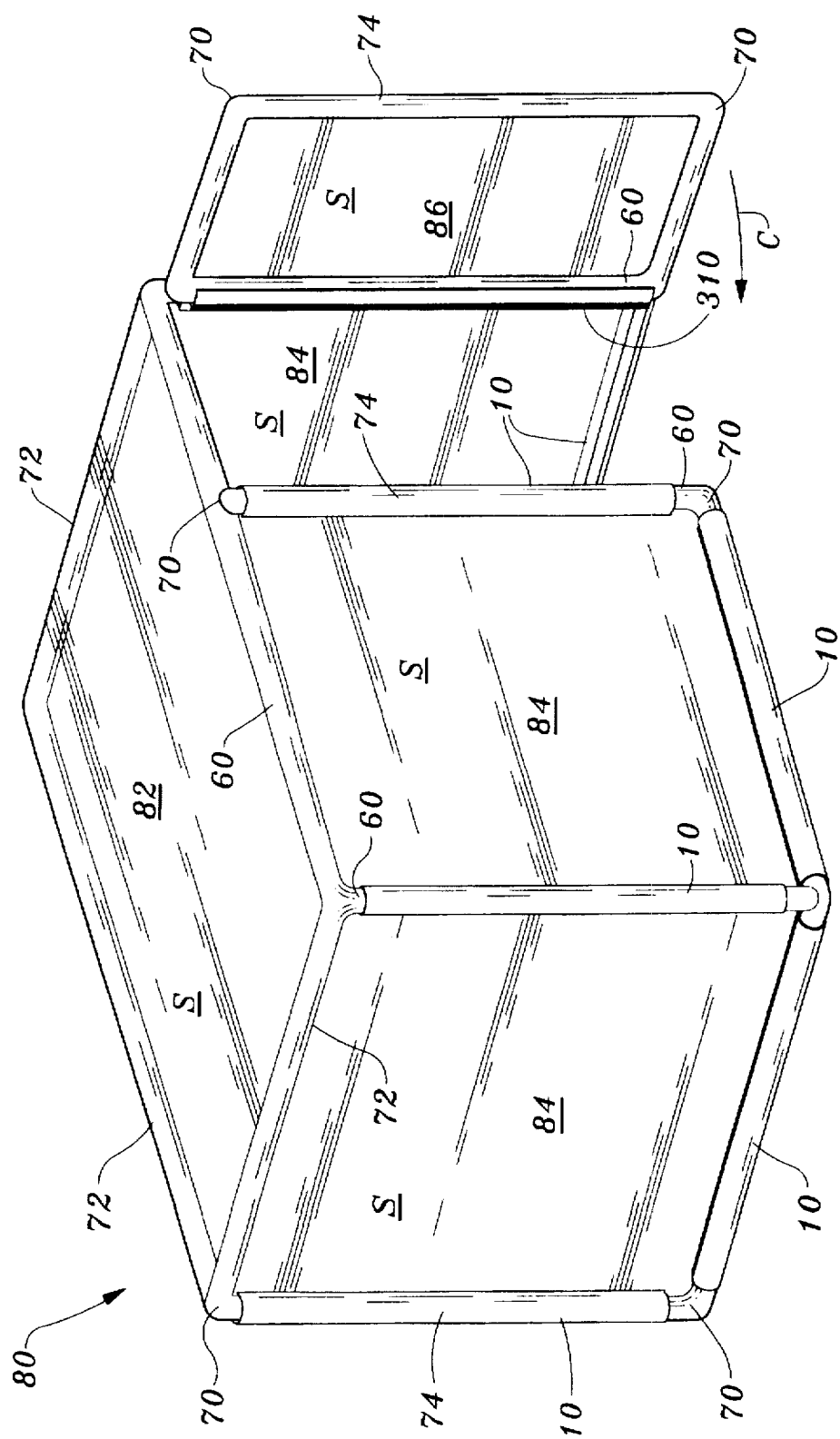

METHOD AND APPARATUS FOR SECURING FLEXIBLE SHEETING TO A CYLINDRICAL STRUCTURE

FIELD OF THE INVENTION

The following invention relates to connectors for securing flexible sheeting material to linear elongate elements. More specifically, this invention relates to clamps having a generally cylindrical contour which can resiliently snap over a cylindrical structural element with flexible thin sheeting material interposed between the clamp and the structural element.

BACKGROUND OF THE INVENTION

A variety of different situations exist where a need is presented for attaching flexible sheeting (i.e. plastic, netting, screen material, tarps, cloth etcetera) to an elongate substantially rigid structure such as plastic or metal tubing. For instance, greenhouses, aviaries, shade providing awnings, screen porches, sand blasting rooms, painting rooms, soccer goals, hockey goals, baseball backstops, signs and banners, playground shades and anywhere that elongate tubing is used in conjunction with sheeting material provide applications where sheeting material must be effectively secured to elongate frame elements to form a specific structure.

While many different techniques exist for attaching sheeting material to elongate frame elements of a structure, these various different known techniques suffer from a variety of drawbacks. For instance, adhesive tape can be used to attach sheeting material to elongate frame elements. However, tape tends to be permanent or cause damage when removed. If tape of appropriate adhesion is selected so that no damage is done to the sheeting material when the tape is removed, the tape still loses its adhesive ability over time.

Conventional fasteners such as nails, rivets and staples are not suitable for applications where the sheeting material is only desired to be temporarily attached to the frame elements. Additionally, such conventional fasteners can have a tendency to tear the sheeting material because they provide attachment at single point locations rather than along an entire length of the frame elements. Adhesives and glues can effectively secure sheeting material to frame elements of a structure. However, such adhesives typically provide a permanent connection, rather than allowing the sheeting material to be temporarily attached to the frame elements and then be removed when the need for the structure no longer exists and it is desired to collapse the structure for storage or reconfiguration.

Another class of connectors utilizes an elongate clamp having a constant "C-shaped" cross-section and is formed of a resilient material allowing the clamp to open and close somewhat. An interior region of the clamp is sized to conform to a size of cylindrical frame elements forming the structure and sheeting material is draped over the cylindrical frame element and the clamp is snapped over the frame element securing the sheeting material between the clamp and the frame element. Such sheeting connection systems are illustrated by the patents to Yardas (U.S. Pat. No. 4,759,518), Lishman (U.S. Pat. No. 3,114,412) and Saether (U.S. Pat. No. 3,816,885).

While these prior art connection systems illustrate the general concept of providing a resilient "C-shaped" clamp for securing sheeting material to a frame element, none of these disclosed prior art connection systems are satisfactory in providing a connection system which can facilitate simple formation of the structures for the applications identified above. For instance, the Yardas trash bag support system requires specialized frame elements rather than merely elongate frame elements of a cylindrical contour. Lishman utilizes free floating cylindrical frame elements which are not rigidly positioned with respect to each other and so do not form any type of rigid structure there between. Saether utilizes flexible cables as frame elements, rather than tubing or other rigid frame elements and so is limited to structural applications where the frame elements are always in tension and not in situations where the frame elements must resist compression loads.

Accordingly, a need exists for a connection system which is usable to readily secure flexible sheeting to cylindrical frame elements to form a desired structure, the connection system being readily undone to allow collapsibility and reconfiguration of the structure formed by the individual frame elements.

SUMMARY OF THE INVENTION

This invention provides a method and apparatus for securing flexible sheeting to cylindrical frame elements forming a structure in a temporary fashion. The structure is formed from a group of elongate cylindrical elements, such as tubing which has ends thereof joined together by rigid joints so that a structure having the desired configuration is outlined by the individual frame elements. Flexible sheeting of a desired type is draped over the structure formed by the frame elements so that the sheeting material is positioned as desired. Clamps are then utilized to secure the sheeting material to the individual frame elements forming the structure.

Each clamp is an elongate construct having a generally "C-shaped" contour. Each clamp includes an interior region which is generally circular and has a diameter similar to a diameter of a cylindrical surface of the frame element to which the clamp attaches. A gap leads from outside of the interior into the interior region of the clamp. The gap has lips defining its width which can be resiliently displaced away from each other when a force is applied against the lips by the elongate cylindrical frame elements. The lips can pivot sufficiently to allow the cylindrical frame elements to pass through the gap and into the interior of the clamp. The lips then return to their original position securing the cylindrical frame elements within the interior. This process can be reversed to remove the cylindrical frame elements out of the interior and away from the clamp.

The flexible sheeting material is secured to the clamp and the cylindrical frame element by interposing the sheeting material between the cylindrical frame element and the clamp when the clamp is "snapped" over the cylindrical frame element. Clamps are utilized at desired locations along the cylindrical frame elements forming the structure so that the sheeting material is secured to the cylindrical frame elements where necessary to provide the sheeting material in the desired configuration. The lips are provided with tips which extend further from each other than a narrowest portion of the gap of the clamp. The lips thus present a contact surface to the cylindrical frame elements when they are placed adjacent the lips and force is applied to snap the cylindrical elements into the interior of the clamp.

Ribs can be provided on an inner surface of the interior of the clamp which extend toward a center of the interior of the clamp. The ribs assist in preventing the sheeting material from sliding around the cylindrical frame element and between the cylindrical frame element and the clamp should such forces by applied to the sheeting material.

3

If desired, entire enclosures can be formed from a series of frame elements oriented along edges of the enclosure, with corners of the enclosure provided by joints between individual cylindrical frame elements. Two clamps can be secured to each other by a hinge so that separate rigid structures formed of separate groups of frame elements can be pivotably positioned with respect to each other. Such a hinge allows for the creation of a door in applications where an entire enclosure is provided with the frame elements and the flexible sheeting material.

OBJECTS OF THE INVENTION

Accordingly, a primary object of the present invention is to provide an apparatus for securing flexible sheeting material to an elongate cylindrical frame element forming part of a structure of multiple frame elements attached to each other.

Another object of the present invention is to provide a method for securing flexible sheeting material to multiple elongate cylindrical frame elements forming a structure.

Another object of the present invention is to provide a system for temporary connection of flexible sheeting material to a structure formed from multiple cylindrical frame elements which are attached together in a manner forming the structure.

Another object of the present invention is to provide a clamping system for securing flexible sheeting material to a cylindrical frame element in a manner which is easily attachable and detachable.

Another object of the present invention is to provide a clamping system which allows flexible sheeting material to be attached to commonly available cylindrical frame elements such as polyvinyl chloride plastic pipe.

Another object of the present invention is to provide an enclosure which is formed from a series of cylindrical frame elements joined together and with flexible sheeting material secured to the individual frame elements through clamps.

Another object of the present invention is to provide a clamp for securing flexible sheeting material to a cylindrical frame element which exhibits sufficient flexibility to allow the cylindrical frame element to pass into a cylindrical interior of the clamp and sufficient rigidity to require more force to remove the clamp from the cylindrical frame element than would typically be applied thereto by ordinary forces applied to the clamp and frame element, such as wind loads or loads associated with a person accidentally bumping into the clamp and cylindrical frame element or flexible sheeting material passing there between.

Another object of the present invention is to provide a clamp for attaching flexible sheeting material to a cylindrical frame element which is formed from readily available materials and has a configuration which facilitates manufacture of the clamp utilizing a variety of different methods including injection molding from a plastic material.

Another object of the present invention is to provide an enclosure which can be readily erected and collapsed and effectively house items placed within the enclosure.

Other objects of this invention will become apparent from a careful reading of the claims and detailed description provided herein as well as from review of the drawing figures.

BRIEF DESCRIPTION OF THE DRAWINGS

FIG. 1 is a perspective view of the connection system of this invention including a clamp secured to a cylindrical frame element with flexible sheeting material interposed between the clamp and the cylindrical frame element.

4

FIG. 2 is a perspective view of the clamp of this invention.

FIG. 3 is a full sectional view of that which is shown in FIG. 2.

FIG. 4 is a sectional view of the clamp and cylindrical frame element of this invention together with the flexible sheeting material, exhibiting the process of placing the clamp over the cylindrical frame element and sheeting material to form the connection illustrated in FIG. 1.

FIG. 5 is a full sectional view of that which is shown in FIG. 1.

FIG. 6 is a full sectional view of an alternative embodiment of the clamp of FIGS. 1–5.

FIG. 7 is a full sectional view of a second alternative embodiment of the clamp as shown in FIGS. 1–5.

FIG. 8 is a full sectional view of a third alternative embodiment of the clamp as shown in FIGS. 1–5 which exhibits a hinge between two separate clamps.

FIG. 9 is a perspective view of an enclosure formed from a series of cylindrical frame elements joined together with end joints and with flexible sheeting material draped over the frame elements and secured to the frame elements with the clamps and with the third alternative embodiment of FIG. 8 utilized to provide a hinged door to the enclosure.

DESCRIPTION OF THE PREFERRED EMBODIMENT

With reference to the drawings, wherein like reference numerals represent like parts throughout the various drawing figures, reference numeral 10 is directed to a clamp for securing sheeting material S to a frame element 60 forming part of a structure such as an enclosure 80 (FIG. 9).

In essence, and with particular reference to FIGS. 1–4, the connection system of this application includes the following basic details. The clamp 10 is generally "C-shaped" in cross-section having a gap 16 leading to an interior 18. The interior 18 is generally cylindrical and has a diameter which matches a diameter of the cylindrical surface 64 of the frame element 60. The sheeting S is formed from a thin flexible layer of the material desired for construction of the structure. The sheeting S is sufficiently thin that it can be interposed between the cylindrical surface 64 of the frame element 60 and an inner surface 20 of the clamp 10. The clamp 10 is defined around the interior 18 by the inner surface 20 and also includes an outer surface 30 parallel to and spaced from the inner surface 20. The clamp 10 has two lips 40 defining the edges of the gap 16. The lips 40 extend away from the gap 16 to tips 44 allowing the clamp 10 to more easily pass around the cylindrical frame element 60 (FIG. 4).

Slits 50 can be provided in the clamp 10 to allow the clamp 10 to flex somewhat (arrow B) to conform to a curving frame element. The frame elements 60 are secured together by end joints 70 (FIG. 9) so that an enclosure 80 or other structure can be formed by a series of frame elements 60. The sheeting S is then draped over the frame elements 60 and secured to the frame elements 60 through use of the clamps 10.

More specifically, and with particular reference to FIGS. 2 and 3, details of the clamp 10 are provided. The clamp 10 is an elongate substantially rigid construct having a constant substantially "C-shaped" cross-section along its entire length. The clamp 10 includes a first end 12 spaced from a second end 14. The clamp 10 exhibits a gap 16 on one side thereof which leads into an interior region 18 of the clamp 10.

The interior region 18 is defined by the inner surface 20 which is substantially cylindrical except that it is broken at the location of the gap 16. The inner surface 20 thus has a throat portion 21 adjacent the gap 16, a diverging region 22 where two opposite walls of the inner surface 20 diverge away from each other, an extreme 23 where a maximum width of the inner surface 20 is provided and a converging region 24 where opposite walls of the inner surface 20 return toward each other until they meet at a side of the inner surface 20 opposite the gap 16.

Because the inner surface 20 exhibits a first narrow width, then increasing width along the diverging region 22, and then decreasing width from the extreme 23 to the converging region 24, the cylindrical frame element 60 can be trapped within the interior 18 with the clamp 10 and secured to the cylindrical frame element 60.

The clamp 10 is preferably formed from a material which exhibits an optimum amount of both elasticity and rigidity. Specifically, the clamp 10 is sufficiently flexible and elastic that the throat 21 of the inner surface 20 can be flexed open to a width which matches a width of the extreme 23 of the inner surface 20 without undergoing plastic deformation or other permanent damage to the clamp 10. The clamp 10 must be sufficiently resilient and elastic that the throat 21 will return to its original position once the cylindrical frame element 60 is located entirely within the interior 18 or has been removed away from the clamp 10.

Additionally, the clamp 10 must exhibit sufficient rigidity that the throat 21 cannot be too easily opened and closed, but rather so that the clamp 10 will securely hold a frame element 60 within the interior 18 of the clamp 10 unless a non-incidental force is applied to remove the frame element 60 out of the interior 18 of the clamp 10. Different applications for the connection system of this invention could require different forces for securing the clamps 10 to the cylindrical frame element 60 and for removal of the frame element 60 from the clamps 10. When an enclosure 80 is provided, it is desired that at least ten pounds of force be necessary to cause a cylindrical frame element 60 with sheeting material S adjacent thereto to be forced into the interior 18 of the clamp 10. Through selection of different materials and through appropriate selection of thicknesses for the clamp 10 between the inner surface 20 and the outer surface 30, the force necessary to cause the throat 21 to match in width the width of the extreme 23 can be selected to be any of a variety of different forces, depending on the particular application.

The inner surface 20 of the clamp 10 is preferably provided with a series of ribs 26 which extend away from the inner surface 20 and toward a center of the interior 18 of the clamp 10. The ribs 26 preferably have a height of only one-hundredth of an inch when the wall thickness of the clamp 10 from the inner surface 20 through to the outer surface 30 is six-hundredths of an inch and when the overall diameter of the inner surface 20 is 0.735 inches for attachment to three-quarter inch diameter frame elements 60.

Note that the inner surface 20 actually has a diameter which is slightly less than that of the frame element 60, so that the clamp 10 remains expanded somewhat at all times when the frame element 60 is located therein.

Expansion of the clamp 10 is further enhanced slightly by the thickness of the sheeting S and by the height of the ribs 26. Thus, a slight friction fit is provided between the clamp 10 and the frame element 60 to prevent the clamp 10 from sliding along a long axis thereof out of its desired position, but rather remaining in the position where it is first located.

For frame elements 60 having different diameters and for applications where a greater or lesser amount of force is desired for attachment and detachment of the clamps 10 to the frame elements 60, these specific dimensions provided would be altered accordingly to provide the desired design characteristics.

The presence of the ribs 26 on the inner surface 20 prevents the sheeting S from translating along the inner surface 20 and between the cylindrical frame element 60 and the inner surface 20 and sliding out of position. The ribs 26 are preferably substantially triangular in configuration so that they have a point which tends to dig into the sheeting S somewhat to prevent such slippage of the sheeting S from occurring. Preferably, the ribs 26 are only located between the extremes 23 and along the converging region 24 of the inner surface 20. Thus, the ribs 26 do not interfere with the attachment and detachment of the clamp 10 to the cylindrical frame element 60 and do not have a tendency to tear at the sheeting S during positioning of the clamp 10 around the sheeting S and cylindrical frame element 60 and removal of the clamp 10. Rather, the diverging region 22 and throat 21 of the inner surface 20 are preferably smooth.

The throat 21 of the inner surface 20 provides the two opposing surfaces which define the gap 16 of the clamp 10. The clamp 10 does not stop at the throat 21, but rather continues beyond the gap 16 with the lips 40. Preferably, one lip 40 is provided at each side of the gap 16 so that each side of the throat 21 has a lip 40 attached thereto. Each lip 40 has a base 42 where the lip 40 attaches to the cylindrical portion of the clamp 10 and a tip 44 opposite the base 42. Preferably, the lip 40 curves from the base 42 to the tip 44 in a direction which causes the two lips 40 to curve away from each other and away from the gap 16.

Preferably, the curvature of the lips 40 is sufficient that the tips 44 are spaced further away from each other than a width of the cylindrical frame elements 60. In this way, when the clamp 10 is to be secured over a cylindrical frame element 60, the cylindrical frame element 60 first abuts a contact surface 46 between the tip 44 and the base 42 of each lip 40, rather than directly abutting the tips 44 of the lips 40. The lips 40 and the attached diverging regions 22 of the clamp 10 are thus encouraged to be spread apart from each other, rather than merely being pushed in toward other portions of the clamp 10. The contact surface 46 is preferably smooth so that a continuous smooth surface is provided for contact of the sheeting S and the cylindrical frame element 60 with the inner surface 20 of the clamp 10 entirely into position (along arrow A) within the interior 18 of the clamp 10 (FIG. 4).

Preferably, the clamp 10 is formed in a continuous linear shape formed from a hydrocarbon polymer material using the extrusion process. The hydrocarbon polymer would enable a tight fit on the sheet material S while still conforming to large arcs or bends of the structural tubing 64.

In certain applications clamp 10 may be made from spring type metal or hydrocarbon polymer in the injection molding process. In that case a series of slits 50 accommodate sharper bends. The slits 50 extend from the extreme 23 through to the lips 40. Thus, each slit 50 has an opening 52 adjacent the lips 40, a base 54 adjacent the extremes 23 of the inner surface 20 and side edges 56 which are parallel to each other and extend from the base 54 through to the opening 52 of each slit 50. The number of slits 50, spacing between slits 50 and the width between the side edges 56 of each slit 50 are selected to provide a desired amount of flexibility to the long central axis of the clamp 10. With the slits 50, the clamp 10 can be curved to secure sheeting S to a frame element which exhibits a curvature. By adding additional slits 50 or by making each slit 50 wider, a radius of curvature of the clamp 10 can be optimized to match a radius of curvature of an underlying frame element to which the clamp 10 may need to attach.

Preferably, the clamp 10 is formed from a hydrocarbon polymer material which is capable of being injection molded into a mold having the contour desired for the clamp 10. By selecting the appropriate polymer and forming the mold in the appropriate fashion, the characteristics desired for the clamp 10 can be obtained.

With particular reference to FIGS. 1, 4, 5 and 9, details of the cylindrical frame elements 60 and the structures formed thereby are described. Each cylindrical frame element 60 is preferably a substantially rigid elongate construct having a constant circular cross-section extending from ends 62 thereof. Preferably, a cylindrical surface 64 defines an outer periphery of each frame element 60. Preferably this cylindrical surface 64 is smooth and has a constant diameter between the ends 62. Where temporary structures are to be formed from the frame element 60, it is preferable that the frame elements 60 have a hollow interior 66 so that the frame elements 60 are in fact tubular. Alternatively, the frame elements 60 can be solid or vary from their cylindrical contour, so long as the clamps 10 can be secured to the frame elements 60 as discussed above.

While the frame elements 60 are preferably substantially rigid, the frame elements 60 need only be rigid enough to resist substantial deflection when loaded by the sheeting S and other loads specific to the various different applications contemplated for the structures formed from the frame elements 60. Hence, standard plastic polyvinyl chloride (PVC) pipe, while somewhat flexible, would typically be sufficiently rigid to function as the frame elements 60. In applications where the frame elements 60 must support a greater load, either PVC pipe having larger dimensions can be utilized or alternative materials can be resorted to until the desired structural strength is provided by the frame elements 60.

Each structure formed by the frame elements 60 and the sheeting S includes at least two separate frame elements 60 which are secured to each other in some fashion. Preferably, the frame elements 60 are all joined together by end joints 70 which connect ends 62 of separate frame elements 60 together. Alternatively, the frame elements 60 can be held rigidly together by having both frame elements 60 secured to a rigid surface or other suspension means, so long as the frame elements 60 are prevented from having substantial motion relative to each other. If the two frame elements 60 are oriented in a common plane, then sheeting S secured to each of the two or more frame elements 60 will be provided in a manner forming a planar surface when the clamps 10 are utilized to connect the sheeting S to the frame elements 60. If the frame elements 60 are skewed with respect to each other so that they are not oriented in the same plane, a surface can still be provided by the sheeting S, but such a surface formed by the sheeting S would not be planar, but rather would provide some form of irregular surface. A third alternative is that if curving frame elements are provided, other curving surfaces such as cylindrical surfaces could be provided by the sheeting S. When the frame elements are curved in form, the clamps 10 would utilize their slits 50 to conform to the curvature of the frame elements and still secure the sheeting S to the frame elements as discussed above.

While the end joints 70 can be any of a variety of different connectors capable of securing the ends 62 of adjacent frame elements 60 together, preferably the end joints 70 are formed from PVC plastic and have multiple legs radiating from a center of the joints 70, each leg having a diameter which causes the leg to either surround an exterior of the ends 62 of adjacent frame elements 60 or to fit within the hollow interior 66 of the end 62 of the frame element 60.

When temporary collapsible structures are to be formed, the end joints 70 preferably exhibit a friction fit with the frame elements 60 but do not utilize any adhesives or other fastening means for securing the end joints 70 to the frame elements 60. Alternatively, various different adjustable latches could be provided between the end joints 70 and the frame elements 60, such as pins which pass through both the frame elements 60 and the end joints 70 to securely but temporarily secure the frame elements 60 to the end joints 70. If a permanent structure is desired, the frame elements 60 can be secured to the end joints 70 by utilizing appropriate adhesives as known in the art, based on the type of material with which the end joints 70 and frame element 60 are formed.

The legs of the end joints 70 exhibit angular displacement from each other which corresponds to the angular displacement desired for the frame elements 60. For instance, if the enclosure 80 (FIG. 9) is desired, end joints 70 would be utilized including "elbows" with a 90° bend; "tees" having three legs, two of which are displaced 180° from each other and one of which is displaced 90° from the other two legs, all of the legs lying in a common plane; and corners where three legs are provided each leg spaced 90° from the other two adjacent legs. In enclosures such as the enclosure 80, the frame elements 60 are either oriented as horizontal elements 72 or vertical elements 74 depending on how they are connected to the end joints 70. However, if different enclosures or structures are to be provided, the number of different configurations for the end joints 70 and the frame elements 60 is in fact infinite. End joints 70 having more than three legs could be provided and with legs angularly displaced from each other by more or less than 90°. Curving frame elements could also be integrated into such structures as discussed above.

One application for the frame elements 60, clamps 10 and sheeting S is illustrated by the enclosure 80 (FIG. 9). The enclosure 80 is generally configured as an enclosure 80 for sand blasting, painting or other procedures where it is desirable to restrict airborne particles to a defined area. Such an enclosure 80 benefits from being large enough to allow people to pass into and out of the enclosure 80, such as at least six feet in height. Additionally, if the enclosure 80 is collapsible, it can more readily be transported to different locations or taken down when not needed.

To form the enclosure 80, a user would initially provide four horizontal elements 72 to surround a roof 82 of the enclosure 80, four horizontal elements 72 to define lower edges of walls 84 of the enclosure 80 and five vertical elements 74 defining corners in the walls 84 with one of the vertical elements 74 located spaced from a corner to allow for a door 86 in one of the walls 84. The door 86 would be formed from two horizontal elements 72 and two vertical elements 74.

Preferably, one of the vertical elements 74 forming the enclosure 80 and one of the vertical elements 74 at one of the corners in the walls 84 would be joined together by a hinge clamp 310, discussed below, to allow the door 86 to articulate open and closed, along arrow C (FIG. 9). Alternatively, the door 86 can merely be a removable panel providing access into the enclosure 80.

In such an enclosure 80, it can be readily seen which types of end joints 70 would be required for the corners of the enclosure 80 and for portions surrounding the door 86 and forming the door 86. The frame elements 60 would each be attached to the appropriate end joints 70 so that the corners and edges of the enclosure 80 would be defined. Next, sheeting S would be draped over the frame element 60 and end joints 70 and pulled tight so that the sheeting S is essentially planar forming the roof 82 and walls 84.

The sheeting S can either be a single large piece of sheeting S draped over the frame elements 60 and end joints 70 or a series of strips of sheeting S which together enclose the volume of the enclosure 80. Alternatively, the sheeting S can be presewn or otherwise formed to have the desired shape for the enclosure 80. Regardless of the form of the sheeting S, the sheeting S is secured to the frame element 60 by placing the clamps 80 over the sheeting S and frame elements 60, causing the sheeting S to be securely trapped between the cylindrical surface 64 of each frame element 60 and the inner surface 20 of each clamp 10. The enclosure 80 is now prepared for the intended use.

When the enclosure 80 is to be collapsed, the clamps 10 are merely removed from the frame elements 60 and the sheeting S removed from the frame elements 60. The frame elements 60 can then be removed from the end joints 70 for storage and reuse at a later time. While the enclosure 80 has been provided and described in detail to provide details of the method of forming structures in general, using the frame elements 60 and sheeting S, these procedures could be easily modified to allow the formation of various different structures. The basic process would involve orienting the frame elements 60 where desired, fixing the frame elements 60 so that they are securely in place, draping the sheeting S over the frame elements 60 as desired, and orienting the clamps 10 around the frame elements 60 with the sheeting S trapped there between.

With particular reference to FIG. 6, details of an alternative embodiment of the clamp 10 of FIGS. 1–5 is described. The alternative clamp 110 has an inner surface 120 which is substantially identical to the inner surface 20 of the clamp 10 of the preferred embodiment. However, the clamp 110 preferably exhibits the following differences. The inner surface 120 is fitted with serrations 122 adjacent a throat 121 of the inner surface 120. The serrations 122 act to enhance the ability of the clamp 110 to securely hold sheeting S and the frame elements 60 inside the clamp 110. An outer surface 130 of the clamp 110 is faceted with two diverging facets 132 and a rear facet 134, with corners 136 between the diverging facets 132 and the rear facet 134.

Outer serrations 138 are provided on the diverging facets 132 adjacent the corners 136 to enhance the ability of a user to grasp the outer surface 130 of the clamp 110. Additionally, the lips 140 defining the throat 121 are not as pronounced as the lips 40 of the clamp 10 of the preferred embodiment and do not extend beyond the diverging facets 132. The clamp 110 is beneficial in applications where ease of clamp 110 removal is a priority.

A second alternative embodiment of the clamp 10 is provided by the clamp 210, shown in FIG. 7. The clamp 210 exhibits an inner surface 220 which is not cylindrical, but rather is only generally cylindrical with recesses 223 at an upper and lower portion of the inner surface 220. The clamp 210 has a throat 221 and lips 240 which generally correspond in configuration to the throat 21 and lips 40 of the clamp 10 of the preferred embodiment.

The clamp 210 additionally exhibits an outer surface 230 which has humps 233 adjacent the recesses 223. The humps 233 and recesses 223 allow a user to exert additional force in attaching and removing the clamp 210 to an adjacent frame element 60. Serrations 222 are provided between the recesses 223 and the throat 222 and between the recesses 223 and the inner surface 220 opposite the throat 221. The serrations 222 both assist in securing the clamp 210 to the frame elements 60 and also discourage sheeting S from sliding adjacent the inner surface 220 of the clamp 210.

With particular reference to FIG. 8, details of the hinge clamp 310 are provided. Preferably, the hinge clamp 310 is substantially identical to the clamp 10 of the preferred embodiment except it is paired with another clamp as particularly described below. Thus, an inner surface 320 is provided which is substantially cylindrical and substantially parallel to an outer surface 330. Lips 340 are provided which mirror the lips 40 of the clamp 10 of the preferred embodiment. The hinge clamp 310 exhibits gussets 350 on the outer surface 330 which extend in a substantially triangular manner away from the outer surface 330.

At least one of the gussets 350 is connected to a gusset 350 of another outer surface 330 of another half of the hinge clamp 310 through a hinge 360. Thus, the hinge clamp 310 is in fact similar to two clamps 10 attached together by a hinge 360. While each hinge clamp 310 preferably includes two separate halves, each pair of clamp halves are together considered to form a single hinge clamp 310.

Serrations 338 are provided adjacent the gussets 350 to assist in attaching the hinge clamp 310 to adjacent frame elements 60. While the hinge clamp 310 is shown with at least two gussets 350 extending from the outer surface 330, in fact it is only necessary that one gusset 350 extend from each half of the hinge clamp 310 with one hinge 360 interposed between the two gussets 350 of each half of the hinge clamp 310. Preferably, the hinge 360 is formed by injection molding along with formation of the rest of the hinge clamp 310 and by defining a region where the mold is sufficiently thin that the two halves of the hinge clamp 310 can readily bend about the hinge 360 without damaging the hinge 360. As shown in FIG. 8, the two halves of the hinge clamp 310 can pivot approximately 90° in either direction, about arrow C, before abutting against the other half of the hinge clamp 310.

Alternatively, different devices could be utilized to form the hinge 360 including mechanical hinges attached to the two halves of the hinge clamp 310. FIG. 9 illustrates an application for the hinge clamp 310 to integrate the door 86 into the enclosure 80. Before utilization of the hinge clamp 310, the other portions of the enclosure 80, including the roof 82, walls 84 and door 86 would be completed. The hinge clamp 310 would then be utilized to secure the two vertical elements 74 adjacent each other, located on the door 86 and on the enclosure 80, to be secured to each other through the hinge clamp 310. If necessary, the sheeting S would also be interposed between the vertical elements 74 and the adjacent halves of the hinge clamp 310. Once attached to the hinge clamp 310, the door 86 can be rotated, along arrow C, to allow access into the enclosure 80 and still allow the enclosure 80 to be secure against the migration of items out of the enclosure 80.

Having thus described the invention, it should be readily apparent that various different modifications could be resorted to without diverging from the scope and fair meaning of this invention. For instance, while specific dimensions for the frame elements 60 and clamps 10 have been provided for illustrative purposes and a specific enclosure 80 has been defined for illustrative purposes, various different dimensions for the frame element 60 and clamps 10 and configu- rations for enclosures 80 and other structures could be provided without diverging from this disclosure. Additionally, the specific locations for serrations 122, 222 and ribs 26 could be altered depending on the particular needs for the specified structure to be formed.

What is claimed is:

1. A system for securing flexible sheeting material in a fixed position defining a surface, comprising in combination:

at least two elongate frame elements including a first frame element and a second frame element, each frame element having a substantially cylindrical surface;

means to secure said at least two frame elements directly together without relative motion between said at least two frame elements, said frame elements forming edges of a structure with a corner of said structure provided where said frame elements are secured together by said securing means;

at least two clamps, including a first clamp and a second clamp, each said clamp having a substantially cylindrical inner surface, said inner surface of said first clamp having a diameter substantially identical to a diameter of said cylindrical surface of said first frame element, said inner surface of said second clamp having a diameter substantially identical to a diameter of said cylindrical surface of said second frame element;

each said clamp having a gap passing into an interior region of said clamp faced by said inner surface; and each said clamp formed of resilient material allowing said gap of each said clamp to flex open to an amount equal to one of said diameters of one of said frame elements, allowing said frame element to be located within said interior region with the flexible sheeting material secured between said first clamp and said first frame element and with said flexible sheeting material secured between said second clamp and said second frame element.

2. The system of claim 1 wherein each said clamp includes two lips, one lip located along each edge of said clamp facing said gap, each said lip including a base adjacent said clamp and a tip opposite said base, said tips of said two lips spaced further from each other than a width of said gap; and wherein said lips are closer to each other at a location between said base and said tip of each said lip than said lips are away from each other at said tip of each said lip.

3. The system of claim 1 wherein each said clamp exhibits a plurality of ribs extending away from said inner surface of said clamp and toward said interior region.

4. The system of claim 3 wherein each said rib is oriented along a line parallel to a central axis of said clamp, said ribs restricted to portions of said inner surface between an extreme of said inner surface where said inner surface exhibits a maximum width and a side of said inner surface opposite said gap.

5. The system of claim 1 wherein said gap exhibits a width less than a diameter of said inner surface of said clamp and wherein said gap exhibits a width greater than one-half of said diameter of said inner surface.

6. The system of claim 1 wherein each said frame element is a hollow tube formed from a hydrocarbon polymer material.

7. The system of claim 1 wherein each said frame element is linear.

8. The system of claim 1 wherein at least one of said frame elements is curved and at least one of said clamps is formed from a material having sufficient flexibility to allow said clamp to bend to exhibit a radius of curvature matching the radius of curvature exhibited by said curved frame element.

9. The system of claim 1 wherein each said frame element has a smooth cylindrical surface.

10. They system of claim 1 wherein said position securing means for said frame elements includes at least one joint between ends of said first frame element and said second frame element.

11. The system of claim 10 wherein said position securing means includes a third frame element interposed between said first frame element and said second frame element and attached to said first frame element and said second frame element in a manner restricting the position of said first frame element relative to said second frame element.

12. The system of claim 1 wherein said frame elements are hollow with a wall thickness similar to a wall thickness of said clamps between said inner surface of said clamps and an outer surface of said clamps opposite said inner surface; and wherein said frame elements and said clamps are formed from similar materials, such that said clamps can flex a similar amount as said frame elements when under a similar bending load and said clamps can remain attached to adjacent said frame elements when said frame elements are flexed.

13. The system of claim 12 wherein said frame elements and said clamps are formed from a common hydrocarbon polymer material.

14. The system of claim wherein said frame elements and said clamps are formed from polyvinyl chloride.

15. The system of claim 12 wherein said securing means includes end joints each said end joint having at least two legs radiating from a center, said legs including means to attach to ends of at least two adjacent said frame elements.

16. The system of claim 15 wherein said end joints include said legs oriented non-parallel with each other, said legs having a size which allows said legs to nest with ends of said frame elements, said center of each said end joint defining a corner in said structure.

17. A system for securing flexible sheeting material in a fixed position defining a surface, comprising in combination:

at least two elongate frame elements including a first frame element and a second frame element, each frame element having a substantially cylindrical surface;

means to secure a position of said at least two frame elements without relative motion between said at least two frame elements;

at least two clamps including a first clamp and a second clamp, each said clamp having a substantially cylindrical inner surface, said inner surface of said first clamp having a diameter substantially identical to a diameter of said cylindrical surface of said first frame element, said inner surface of said second clamp having a diameter substantially identical to a diameter of said cylindrical surface of said second frame element;

each said clamp having a gap passing into an interior region of said clamp faced by said inner surface;

each said clamp formed of resilient material allowing said gap of each said clamp to flex open to an amount equal to one of said diameters of one of said frame elements, allowing said frame element to be located within said interior region with the flexible sheeting material secured between said first clamp and said first frame element and with said flexible sheeting material secured between said second clamp and said second frame element;

wherein at least one of said frame elements is curved and at least one of said clamps is formed from a material having sufficient flexibility to allow said clamp to bend to exhibit a radius of curvature matching the radius of curvature exhibited by said curved frame element; and wherein at least one of said clamps exhibits a series of slits passing there through, each said slit extending through said lip of said clamp in a direction substantially perpendicular to a central axis of said clamp, said slits having sufficient width to allow said clamp to bend to exhibit a radius of curvature matching the radius of curvature exhibited by said curved frame element.

18. A clamp for securing flexible sheeting to elongate cylindrical structures, said clamp comprising in combination:

an inner surface having a cylindrical contour and defining an interior region of said clamp;

said inner surface extending from a first lip to a second lip, said first lip and said second lip spaced apart by a gap, said gap providing access into said interior region;

said inner surface having a pair of extremes defining uppermost and lowermost locations on said inner surface, said extremes spaced apart by a diameter of said inner surface, said inner surface being continuously curving on one side of said extremes and said inner surface broken by said gap on a side of said extremes opposite said one side; and wherein said clamp exhibits a constant cross-sectional contour between a first end and a second end except where slits pass from said first lip to an adjacent one of said extremes and from said second lip to an adjacent one of said extremes.

19. The clamp of claim 18 wherein said clamp includes ribs extending from said inner surface of said clamp, said ribs entirely positioned on said one side of said extremes opposite said gap.

20. The clamp of claim 18 wherein said clamp is formed from a material exhibiting sufficient flexibility to allow said first lip and said second lip to be displaced away from each other up to an amount equal to said diameter of said inner surface, without permanent deformation of said clamp; and wherein said first lip and said second lip each include a tip defining an extremity of said first lip and said second lip, said tip of said first lip being spaced away from said tip of said second lip by a distance greater than a width of said gap.

* * * * *